(12) United States Patent
Avganim

(10) Patent No.: US 8,739,583 B2
(45) Date of Patent: Jun. 3, 2014

(54) COMBINATION LOCK WITH REDUCED AXIAL LENGTH

(76) Inventor: Meir Avganim, Gealya (IL)

(*) Notice: Subject to any disclaimer, the term of this patent is extended or adjusted under 35 U.S.C. 154(b) by 210 days.

(21) Appl. No.: 13/338,314

(22) Filed: Dec. 28, 2011

(65) Prior Publication Data

US 2013/0167599 A1 Jul. 4, 2013

(51) Int. Cl.
E05B 69/00 (2006.01)
(52) U.S. Cl.
USPC .............. 70/58; 70/312; 70/314; 70/323
(58) Field of Classification Search
USPC ........... 70/14, 18, 57, 58, 312, 314–317, 323, 70/324, 332
See application file for complete search history.

(56) References Cited

U.S. PATENT DOCUMENTS

| | | | | |
|---|---|---|---|---|
| 1,924,987 A * | 8/1933 | Furino | | 70/26 |
| 3,521,471 A * | 7/1970 | Donato | | 70/312 |
| 3,627,938 A * | 12/1971 | Davidson | | 200/42.01 |
| 4,445,348 A * | 5/1984 | Saitoh | | 70/312 |
| 5,502,989 A * | 4/1996 | Murray et al. | | 70/58 |
| 5,653,136 A * | 8/1997 | Huang | | 70/312 |
| 5,899,099 A * | 5/1999 | Tsai | | 70/26 |
| 5,934,120 A * | 8/1999 | Kuo | | 70/312 |
| 6,711,922 B1 * | 3/2004 | Tsai | | 70/312 |
| 6,799,445 B1 * | 10/2004 | Tsai | | 70/30 |
| 6,799,446 B1 * | 10/2004 | Tsai | | 70/30 |
| 7,107,803 B1 * | 9/2006 | Swanson | | 70/289 |
| 7,458,239 B1 * | 12/2008 | Ma | | 70/21 |
| 7,549,308 B2 * | 6/2009 | Avganim | | 70/58 |
| 8,517,193 B1 * | 8/2013 | Small | | 215/206 |
| 2002/0134121 A1 * | 9/2002 | Kuo | | 70/312 |
| 2009/0095034 A1 * | 4/2009 | White et al. | | 70/57 |
| 2010/0307208 A1 * | 12/2010 | Corbin et al. | | 70/158 |
| 2011/0239715 A1 * | 10/2011 | Weiershausen | | 70/315 |

* cited by examiner

*Primary Examiner* — Suzanne Barrett
(74) *Attorney, Agent, or Firm* — Ostrolenk Faber LLP

(57) ABSTRACT

A lock includes a cylinder with a locking tab extending axially from a distal end, a rod movable between a locked position and an unlocked position. At least one protrusion on the rod, and a pair of blocking elements positioned adjacent to the locking tab. A marked wheel is rotatably mounted on the rod and cylinder, and includes an inner wheel including a ridge extending from an inner surface and a slot extending through the ridge. The rod slides relative to the cylinder when the slot is aligned with the protrusion on the rod.

13 Claims, 19 Drawing Sheets

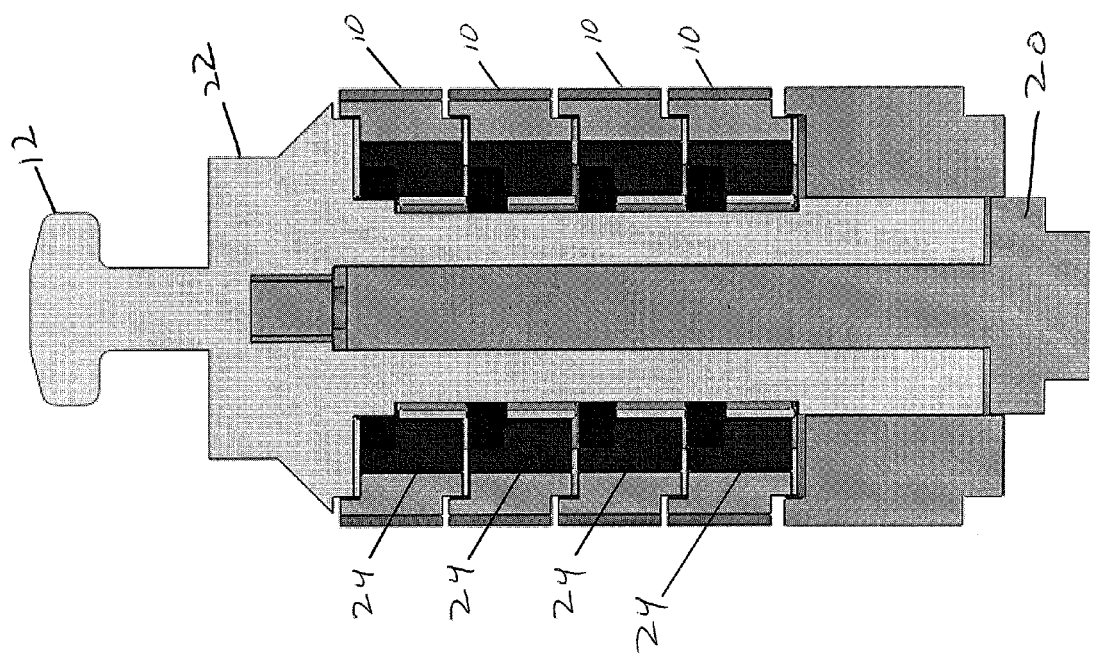

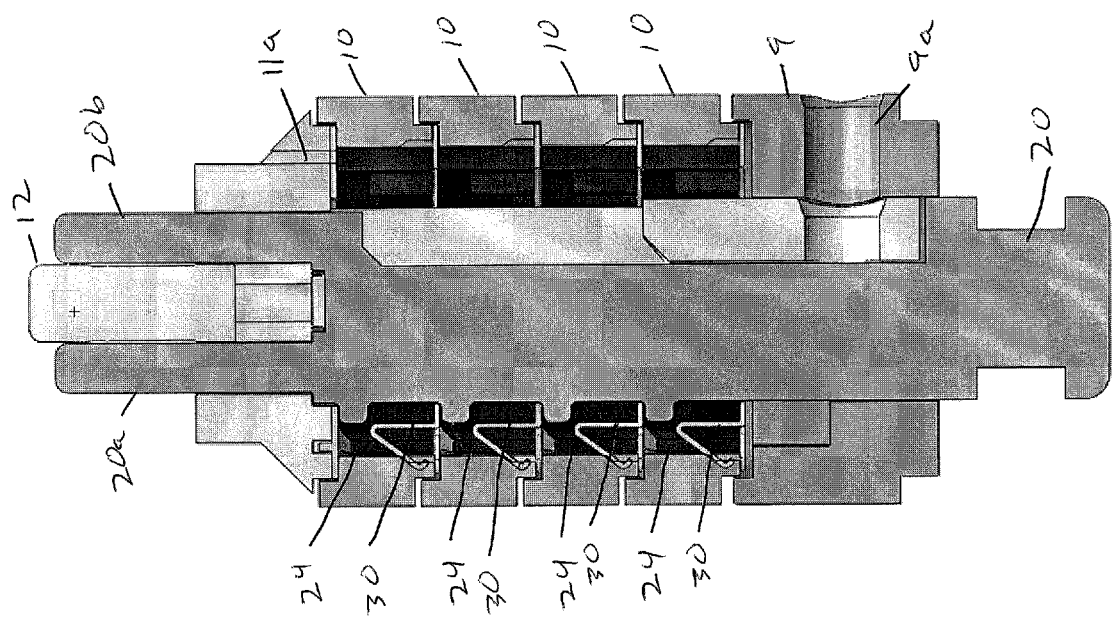

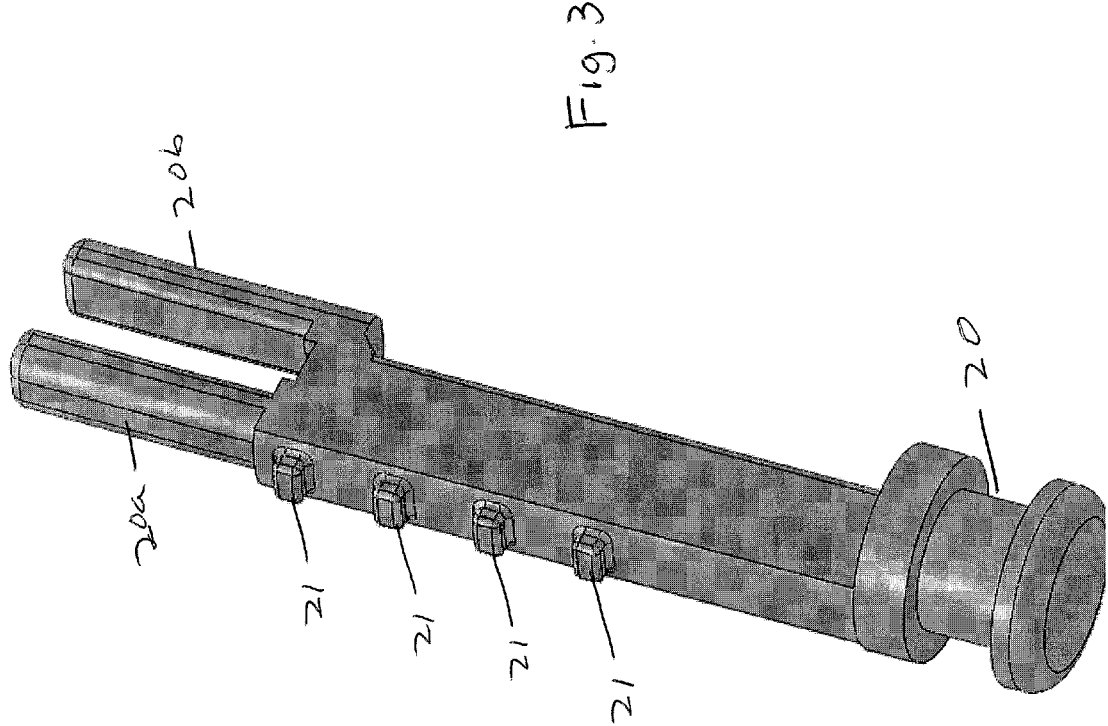

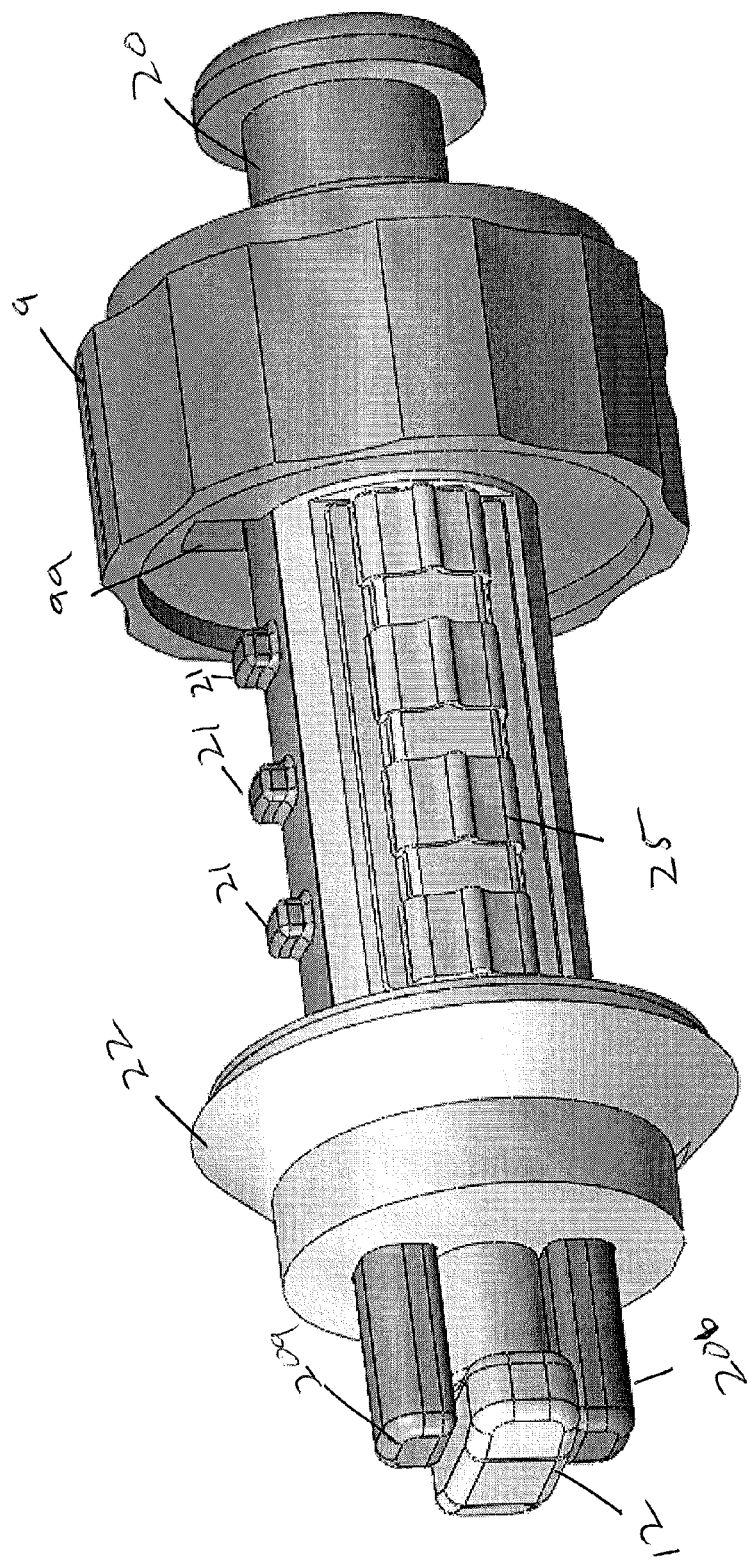

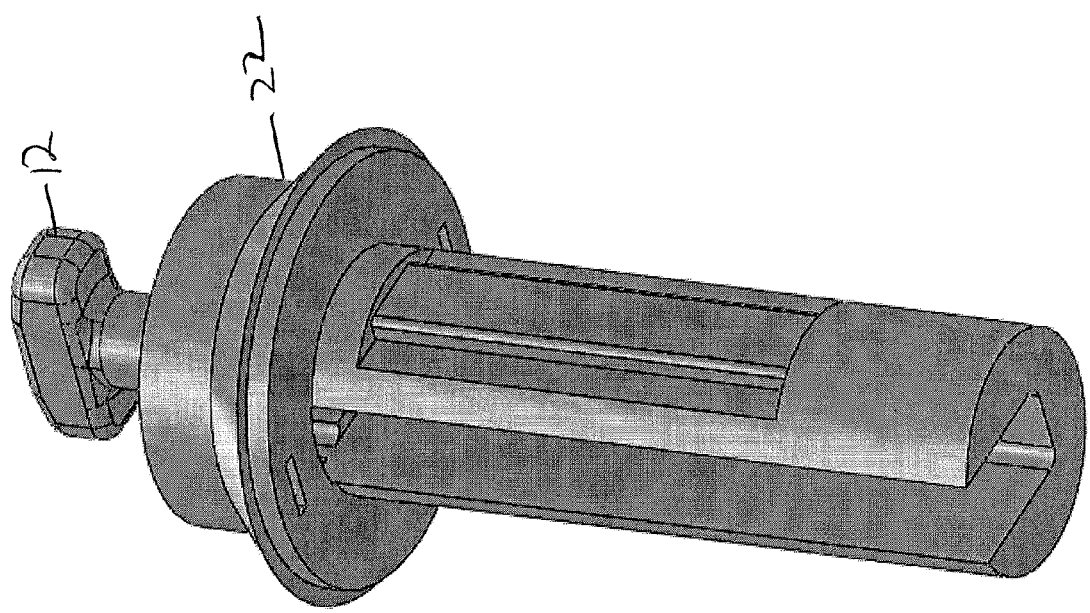

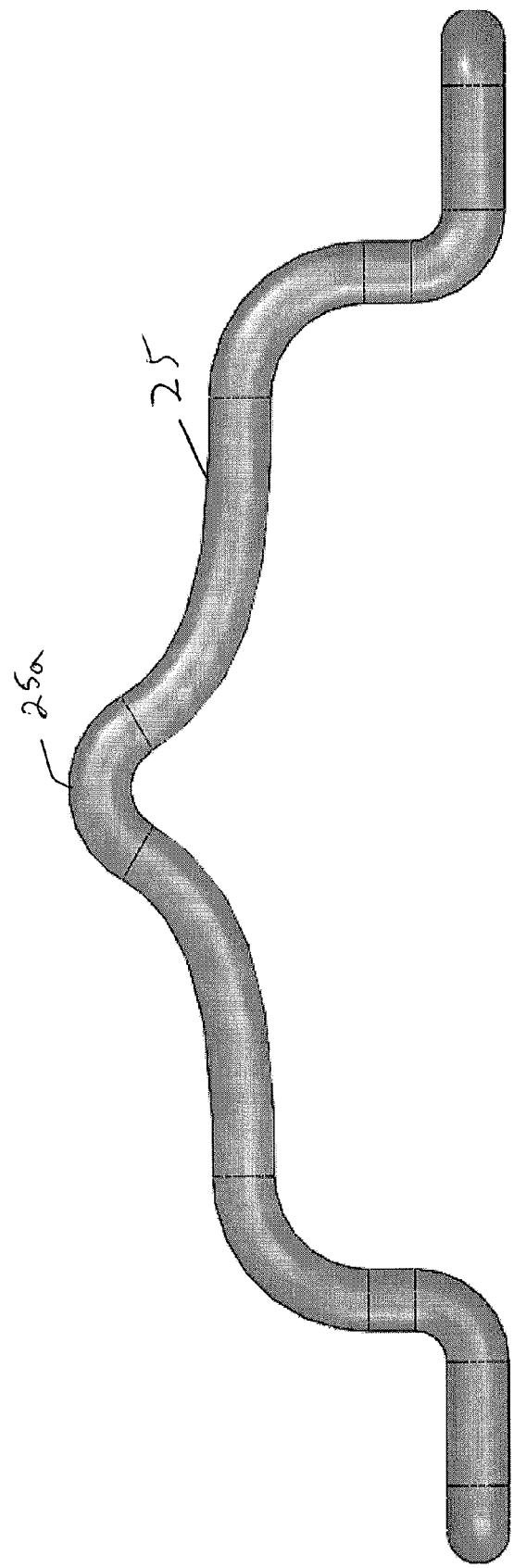

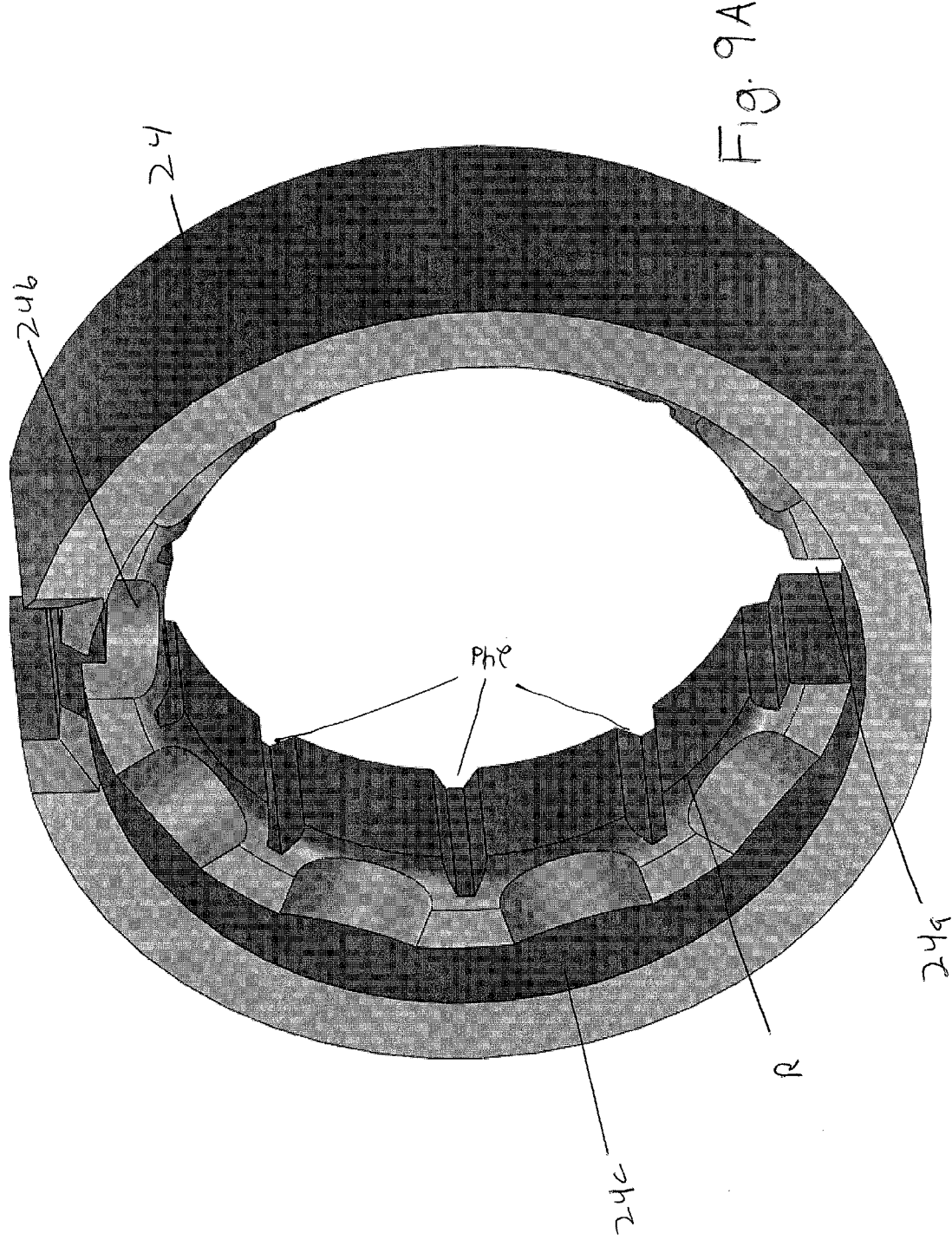

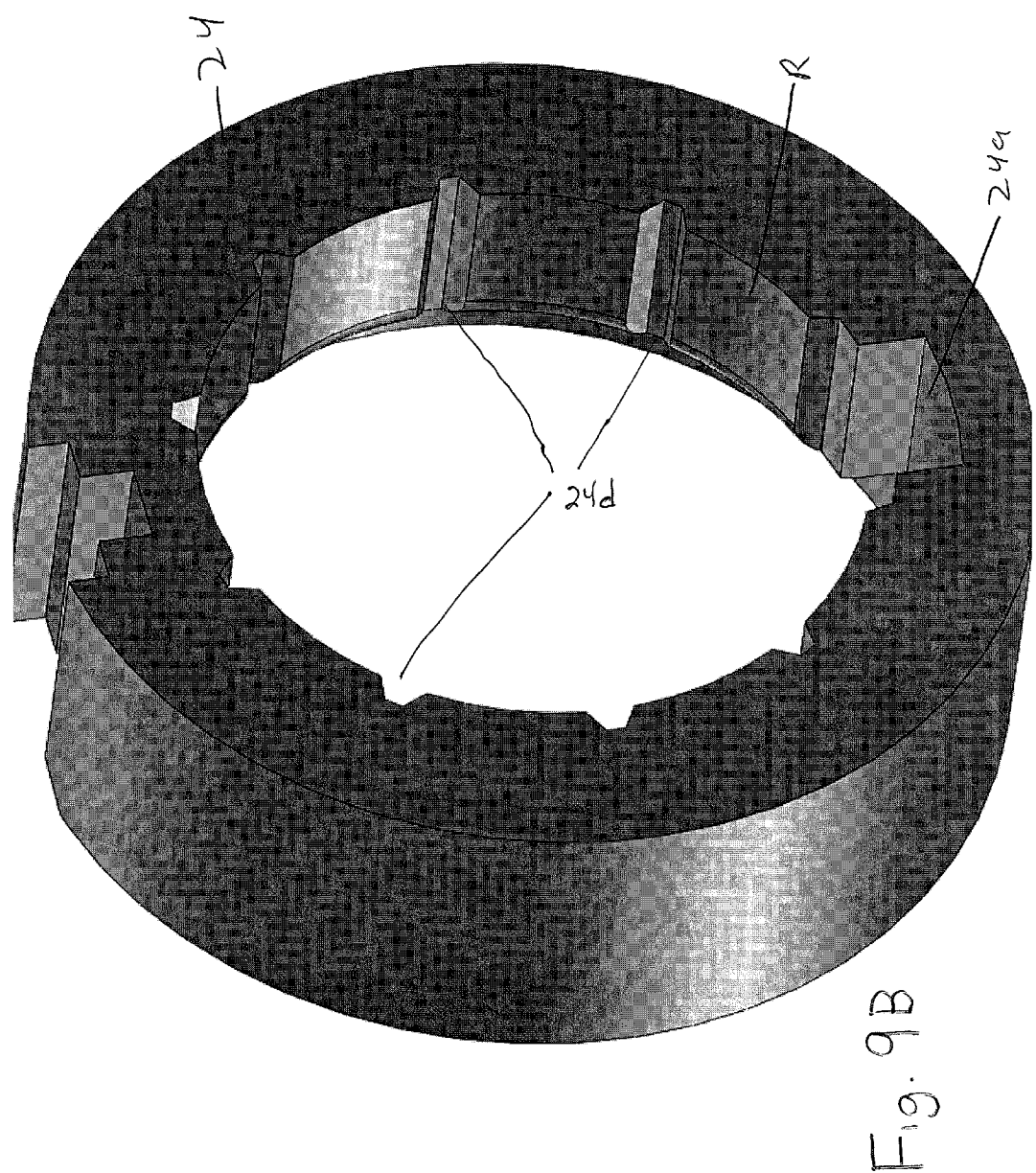

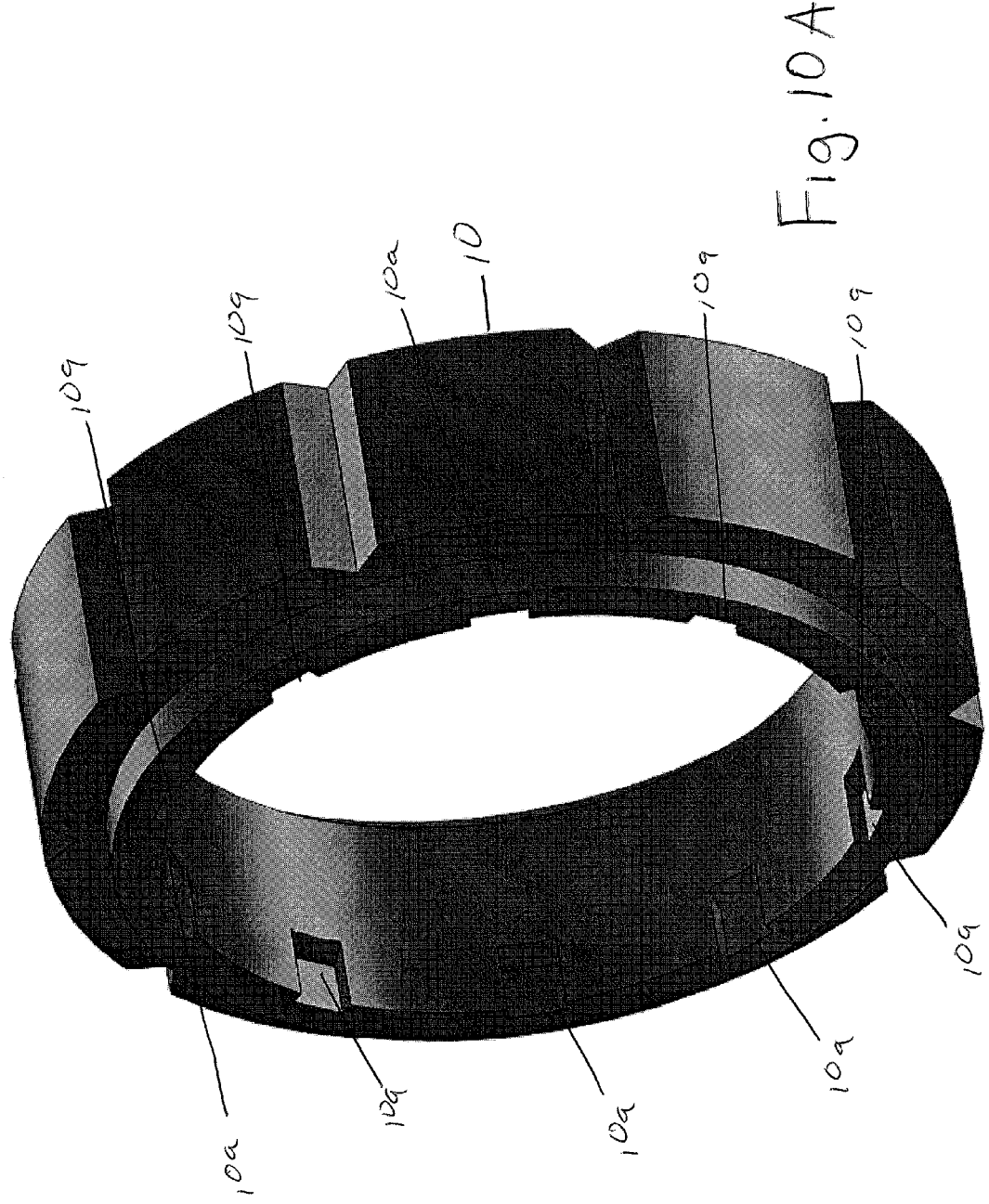

COMBINATION LOCK WITH REDUCED AXIAL LENGTH

BACKGROUND OF THE INVENTION

1. Field of the Disclosure

The present invention relates to a combination type lock with a reduced axial length. More specifically, the present application is related a combination type lock that has a reduced axial length while providing sufficient digits in the combination to provide security.

2. Related Art

With the increased use of portable electronic devices, such as laptops, for example, there is an increasing need to be able to secure such devices. There are a variety of locking systems on the market that are used to secure laptop computers, many of which utilize a lock that engages a slot formed in the body of the laptop. The lock include a T-shape locking tab that is received in the slot and then rotated 90 degrees to prevent its removal. The tab is then locked into this position to ensure that the lock remains connected to the laptop. A cable may connected to the lock to secure the lock and laptop to an immovable, or at least difficult to move object, and thus prevent removal of the laptop.

Some locks are configured to be opened by a key. Other locks are combination type locks that are unlocked by entry of a combination, typically using a number of rotatable wheels. One of the drawbacks of these combination locks is that they tend to be rather large. The wheels in such locks are typically separated from each other to accommodate connectors that connect the outer wheel to an inner wheel including a notch that may be aligned with protrusions on the locking rod to unlock the lock, that is allow for movement of the rod to release the lock from the laptop. This required separation tends to elongate the lock. The more wheels there are in the lock, the more axial length is needed. Generally, it is desirable to have at least four wheels, that is, a four digit combination, to ensure that the total number of possible combinations is sufficiently large to provide security. The use of four number wheels, however, leads to a relatively large length of the lock which is unwieldy.

In addition, conventional combination locks are typically housed in a two piece housing that is connected via rivets. This rivet connection is relatively weak, and thus, easily defeated.

Accordingly, it would be desirable to provide a combination lock suitable for use in securing electronic devices such as laptops that has a reduced length and increased durability.

SUMMARY OF THE INVENTION

It is an object of the present invention to provide a combination type lock suitable for use in securing a laptop or other electronic device via a slot formed in the body of the device that has a reduced axial length, is durable, and whose combination is easily re-settable.

A marked wheel for use in a combination lock including a rod selectively slidable relative to a cylinder to lock and unlock the lock in accordance with an embodiment of the present application includes an inner wheel rotatably mounted on the cylinder and rod, and including a ridge extending from an inner surface thereof, the ridge including a slot extending completely through the ridge at a predetermined position on the inner surface of the wheel, an outer wheel, rotatably mounted on the rod and cylinder outside of the inner wheel and including an outer surface with indicia indicating distinct positions on the outer wheel; and a connector configured to fit substantially within the inner wheel and including a resilient connecting element that selectively engages the outer wheel such that the outer wheel, inner wheel and connector rotate together.

A lock in accordance with an embodiment of the present application includes a cylinder with a locking tab extending axially from a distal end thereof, a rod mounted on the cylinder, and movable between a locked position and an unlocked position to lock and unlock the lock. The rod includes at least one protrusion on a top surface thereof, and a pair of blocking elements extending from a distal end thereof and positioned adjacent to the locking tab when the rod is in a locked position and removed from the locking tab when the rod is in an unlocked position. The lock also includes at least one marked wheel rotatably mounted on the rod and cylinder, wherein positioning of the at least one marked wheel controls movement of the rod. The marked wheel includes an inner wheel rotatably mounted on the rod and cylinder, and including a ridge extending from an inner surface thereof, the ridge including a slot extending completely through the ridge at a predetermined position on the inner wheel, an outer wheel, rotatably mounted on the rod and cylinder outside of the inner wheel and including an outer surface with indicia indicating distinct positions on the outer wheel, and a connector configured to fit substantially within the inner ring and including a resilient connecting element that engages the outer wheel such that the outer inner wheel rotate with the inner wheel. The rod is slidable relative to the cylinder when the slot formed in the ridge on the inner surface of the inner wheel is aligned with the protrusion on the rod.

BRIEF DESCRIPTION OF THE DRAWINGS

FIG. 2A is top cross sectional view of the lock of FIG. 1;

FIG. 2C is a right side cross-sectional view of the lock of FIG. 1;

FIG. 3 is a more detailed view of a rod of the lock element FIG. 1;

FIG. 4 is a more detailed view of a cylinder element of FIG. 1;

FIG. 5 illustrated the rod mounted on the cylinder with the wheels removed;

FIG. 6B is another view of the indexing spring of FIG. 6;

FIG. 9A is a more detailed view of an inner wheel element of the lock

FIG. 9B is a view of the opposite side of the inner wheel of FIG. 9B;

FIG. 10A is a more detailed view of an outer wheel element of the lock;

Other features and advantages of the present invention will become apparent from the following description of the invention, which refers to the accompanying drawings.

DETAILED DESCRIPTION OF EMBODIMENTS OF THE INVENTION

Figure 1:
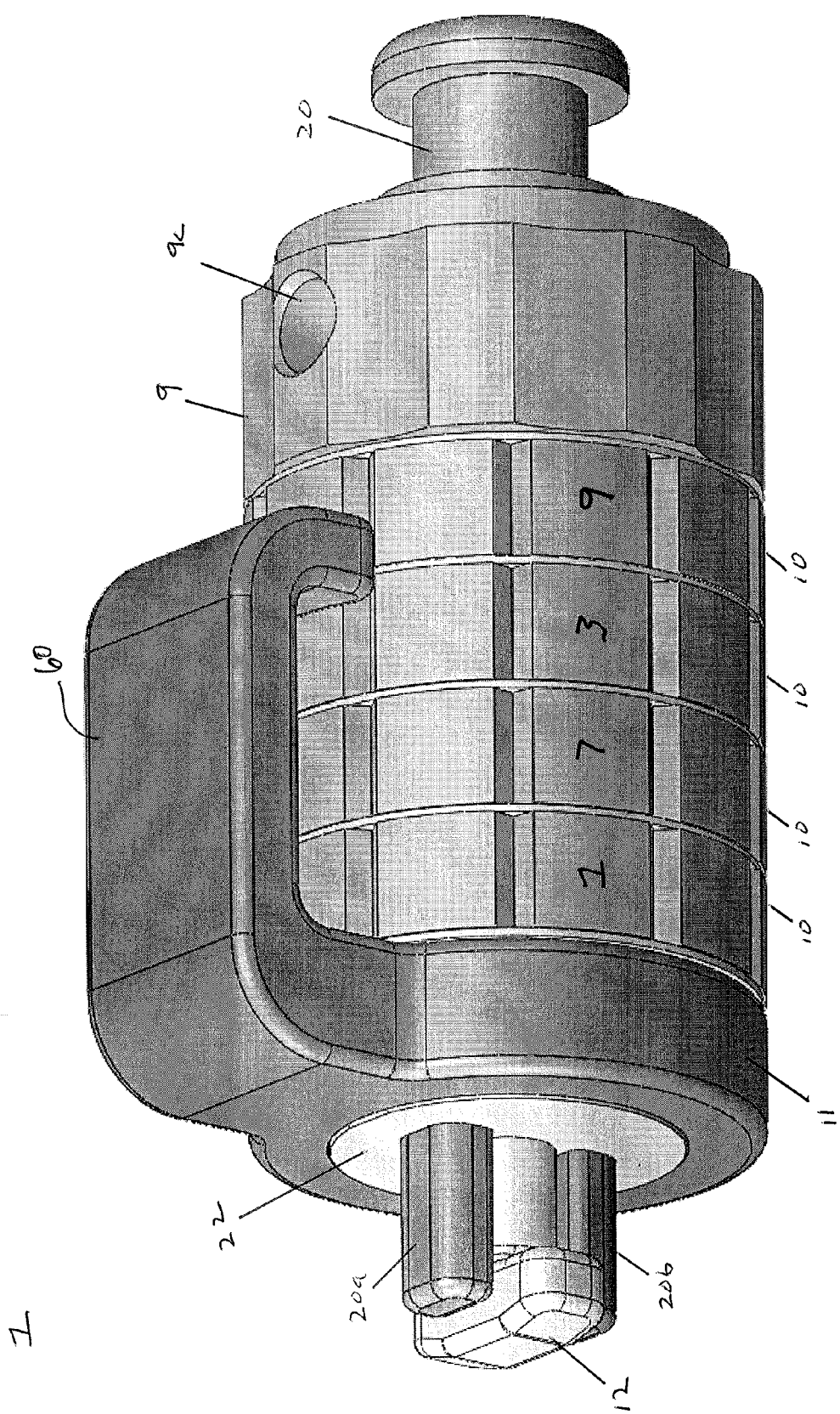
FIG. 1 is a front and left side perspective view of a lock in accordance with an embodiment of the present application.

A combination lock 1 in accordance with an embodiment of the present disclosure is illustrated in FIG. 1. FIG. 1 illustrates a front and top perspective view of the lock 1. As illustrated, the lock 1 preferably includes four numbered wheels 10 positioned adjacent to each other that are used by the user to input the combination used to unlock the lock 1. While the term "numbered" is used herein, it is noted that the wheels 10 need not be numbered, but merely marked to designate unique positions on the wheel so that a unique sequence may be entered to unlock the lock 1. In FIG. 1, only one number is shown marked on each wheel 10, however, each wheel 10 will preferably include several numbers, or other indicia continuing around the wheel. While the lock 1 is shown using four numbered wheels 10, additional or fewer wheels may be used, if desired.

The lock 1 is preferably of the type used with a cable (not shown) to secure an item to a stationary and substantially immovable object. U.S. Pat. No. 5,502,989 shows examples of connecting such a cable to a lock and the uses thereof, and its contents are fully incorporated by reference herein. The lock 1 is connected to a laptop computer, for example, and a cable is secured to the lock and to an immovable, or difficult to move object to keep the laptop from being removed. While a laptop computer us discussed herein, the lock 1 may be used with any portable electronic device provided that the device includes a slot suitable for locking engagement with the lock 1. Specifically, the lock 1 is configured to be secured in a predefined slot formed in a laptop computer, for example. In a preferred embodiment, the slot is approximately 3 mm in height by 7 mm in length and is consistent with slots that are generally included in commercially available laptop computers. A locking tab 12 is provided on the lock 1 to engage the slot on the laptop. The tab 12 is T-shaped and sized such that a top end of the T-shape is received in the slot. The lock 1 is then rotated ninety degrees such that the top end of the T-shape is oriented vertically in the slot. As a result, the tab 12 cannot be pulled out of the slot, since the length of the top end of the T-shape cannot be pulled out of the narrow 3 mm height of the slot. Other types of locking elements are known in the art, e.g., locks with scissor-action locking elements, single pin locks, examples of which are shown in the aforementioned U.S. Pat. No. 5,502,989 and in patents issued to the present inventor and to others.

FIG. 1 illustrates the lock 1 in a locked state with the blocking elements 20a, 20b positioned adjacent to the T-shaped locking tab 12. In this position, the lock 1 cannot be inserted into the slot and cannot be rotated. When the lock 1 is in an unlocked state, however, the rod 20 is retracted such that the blocking elements 20a, 20b on either side of the locking tab 12 retract into the lock 1. The tab 12 may then be inserted into the designated slot of the item to be secured and rotated ninety degrees such that top of the T-shaped locking tab 12 extends vertically in the slot and cannot fit through the narrow 3 mm height of the slot. The rod 20 is then returned to a locked position with the blocking elements 20a, 20b extended into the slot to prevent the lock 1 from being rotated.

As a result, the T-shaped locking tab 12 remains in the slot and the lock 1 is secured to the laptop or other item to be secured.

The rod 20 is preferably mounted on or in the cylinder 22 such that it is movable from a locked position, as illustrated in FIG. 1, for example, to a unlocked positioning which the blocking elements 20a, 20b are retracted into the lock 1. A cap 9 is provided at a proximal end of the lock 1 and is secured to the cylinder 22. In the embodiment of FIG. 1, four wheels 10 are rotatably mounted on the cylinder 22 and rod 20 adjacent to the cap 9. Each wheel 10 is preferably marked with a number or any other suitable indicia to indicate specific positions on an outer surface thereof. The wheels 10 are rotated by a user to predetermined positions to unlock the lock 1, that is, to allow the rod 20 to move axially relative to the cylinder 22. A second cap 11 is provided on the distal end of the cylinder 22 with the wheels 10 positioned between the caps 9 and 11. The cap 9 preferably includes a receiving opening 9c into which a cable is received to connect the lock 1 to an immovable, or at least difficult to move object. The cap 11 may also be used as an accessory retaining element, as well, to secure cords from accessories such as power plugs, and computer mouse devices, for example. The caps 9, 11 are secured to the cylinder to hold the lock elements in place securely.

Figure 2B:
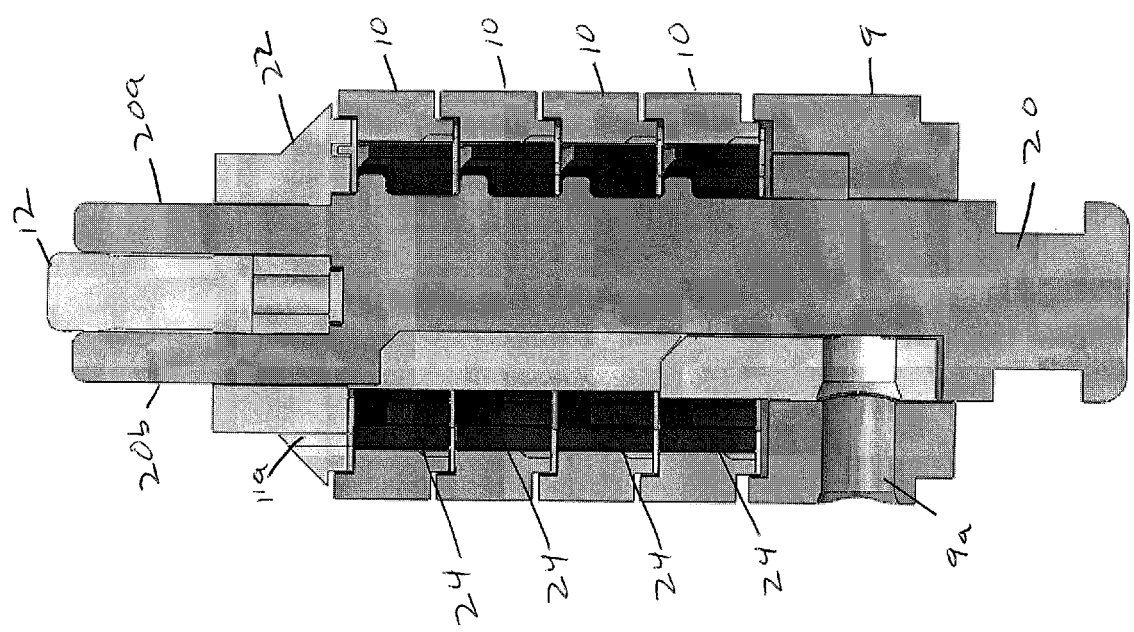
FIG. 2B is a left side cross-sectional view of the lock of FIG. 1

As can be seen in the cross sectional views of FIGS. 2A-2C, for example, each of the wheels 10 is paired with an inner wheel 24 that is also rotatably mounted on the cylinder 22 and rod 20. A connector 30 is configured to connect each inner wheel 24 with a respective outer marked wheel 10 such that the inner wheel 24 rotates with the outer wheel 10.

Figure 7A:
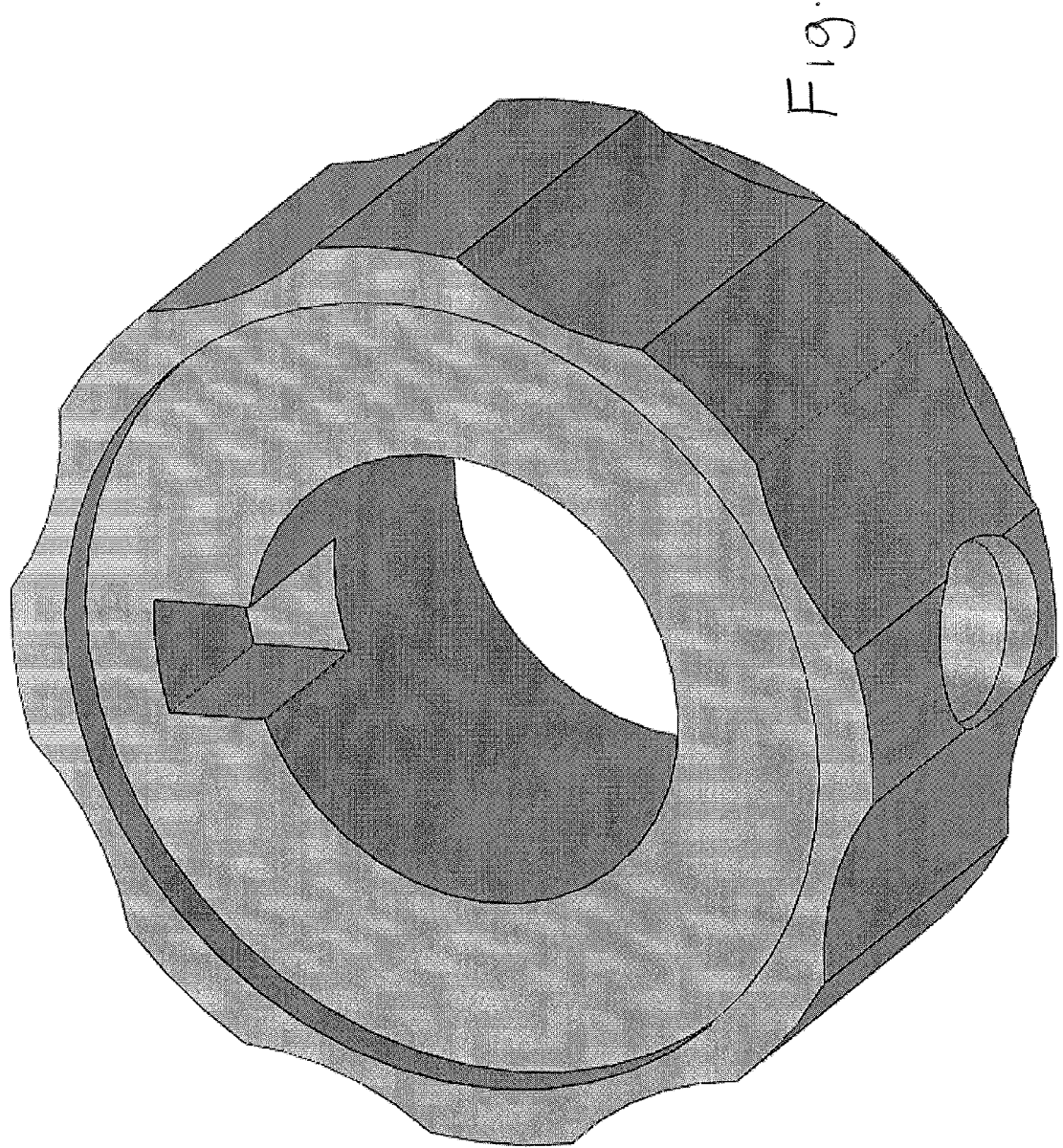
FIG. 7A is a more detailed view of a cap element that is positioned on the cylinder.
Figure 7B:
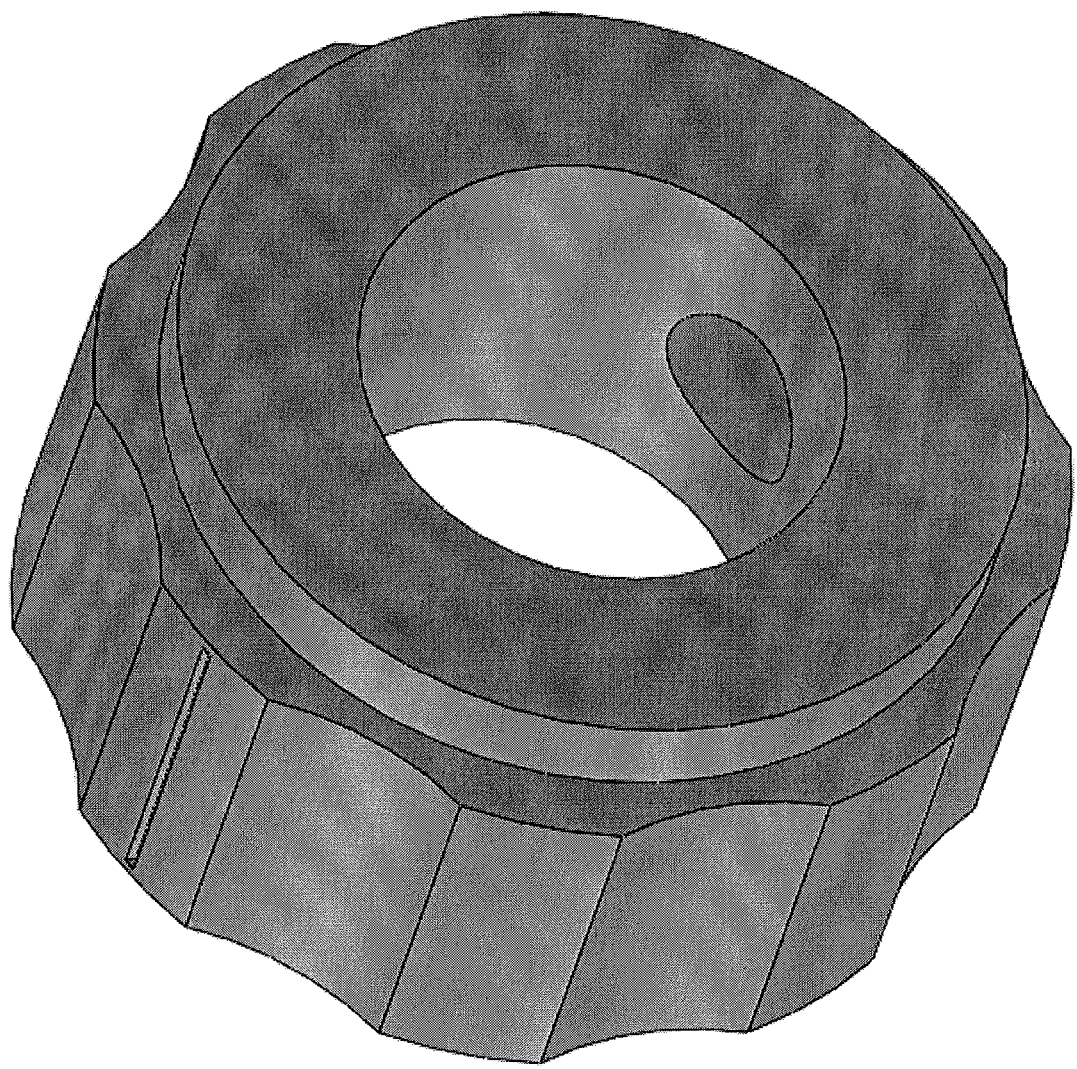
FIG. 7B is an alternate view of the cap element of FIG. 8.

The rod 20 is provided with a row of protrusions 21 formed on a top surface thereof (See FIG. 3, for example). Four protrusions 21 are illustrated, however, the number of protrusions should be equal to the number of wheels 10 used that is, the number of digits in the combination used to unlock the lock 1. The protrusions 21 must be aligned with the slot 24a formed in the ridge R that is provided in the inner surface of each of the inner wheels 24 (See FIGS. 9A-9B, for example) in order to allow the rod 20 to move relative to the cylinder 22 into the unlocked position. The protrusions 21 are also aligned with an opening 9a formed in the cap 9 (See FIGS. 4 and 7A, for example) that allows the rod 20 to slide in the proximal direction into the unlocked position with the blocking elements 20a, 20b retracted into the cylinder 22.

Figure 6A:
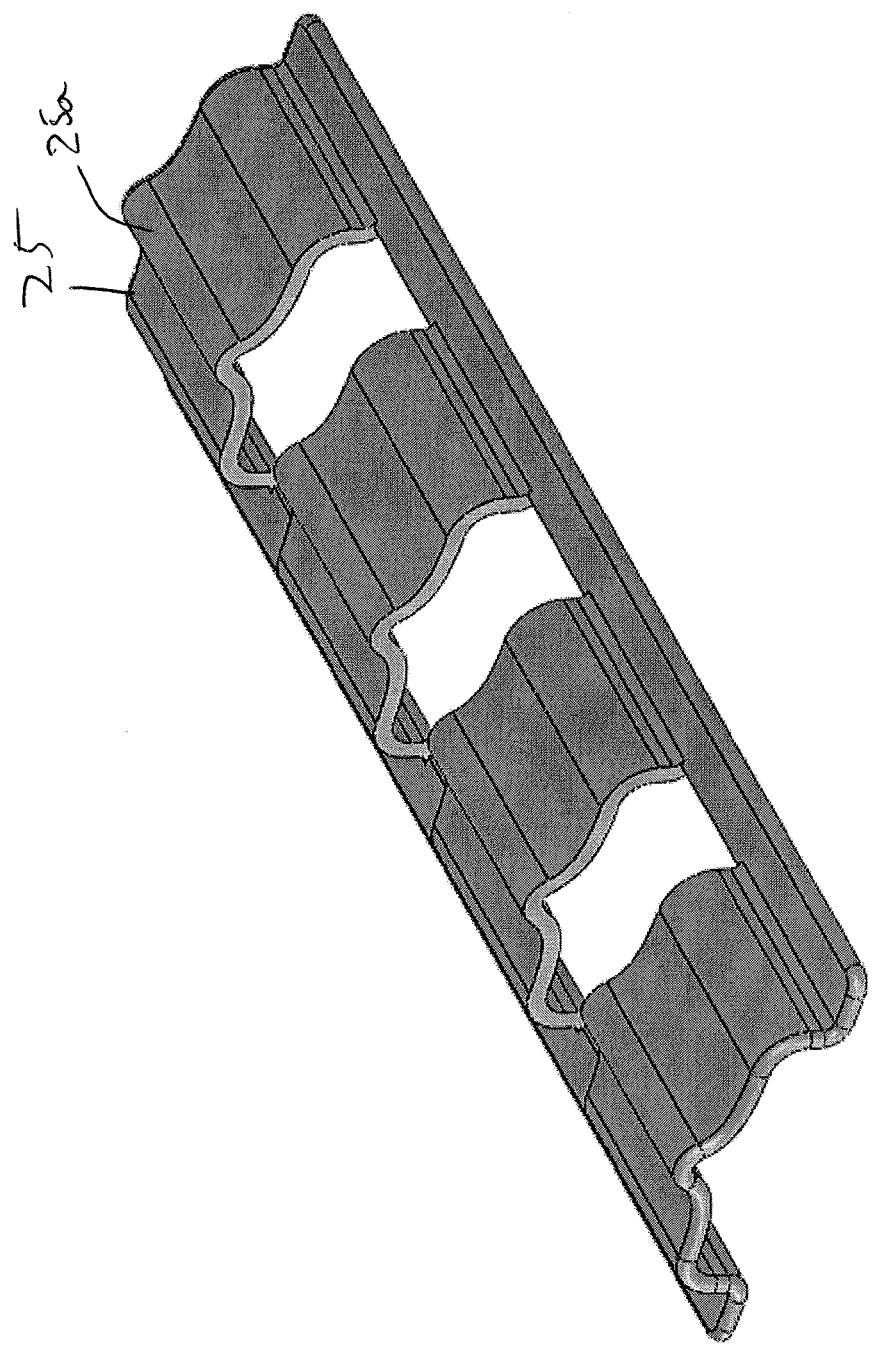
FIG. 6A illustrates an exemplary embodiment of an indexing spring.

FIG. 4 illustrates the cylinder 22 with the rod 20 and cap 9 mounted on the cylinder and without the wheels 10. An indexing spring 25 is further provided on the cylinder 22. This indexing spring 25 is used to bias the inner wheels 24 toward the outer wheels 10 to provide sufficient friction between the wheels 10, 24 and the cylinder 22 to prevent the wheels from rotating on their own. FIGS. 6A-6B illustrate a more detailed view of the indexing spring 25. The tips 25a resiliently engage the detents 24d in the inner wheels 24 (FIG. 9B).

FIG. 9A illustrates a more detailed view of an inner wheel 24. FIG. 9A illustrates a distal facing side of the wheel 24. As illustrated the ridge R is formed on the inner surface of the wheel 24. The slot 24a is formed in and completely through the ridge R at a predetermined position. The ridge R is further spaced inward from the distal edge of the wheel 24 to provide a recess 24c in the distal face thereof. A connecting slot 24b is provided opposite the slot 24a but is not formed through the ridge R entirely. FIG. 9B illustrates the proximal facing side of the wheel 24.

The rod 20 is only movable relative to the cylinder 22 when the slots 24a of all of the inner wheels 24 are aligned with the protrusions 21 of the rod 20. The alignment of the slots 24a can be changed by the user by rotating the outer wheels 10, which are connected to the inner wheels 24 via connectors 30.

That is, the combination that is input by the user via outer wheels 10 aligns the slots 24a with the protrusions 21 to allow the rod 20 to slide into an unlocked position.

Figure 11:
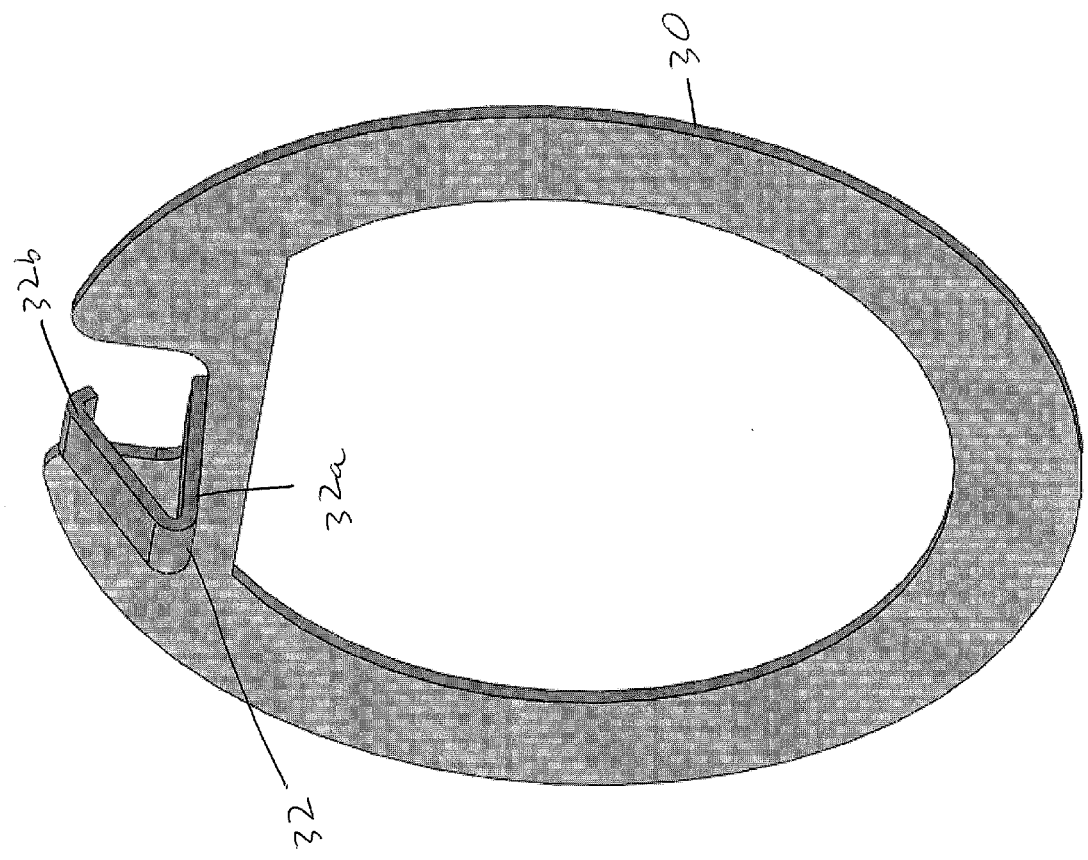
FIG. 11 is a more detailed view of a connector used to connect the inner and outer wheel element.
Figure 12:
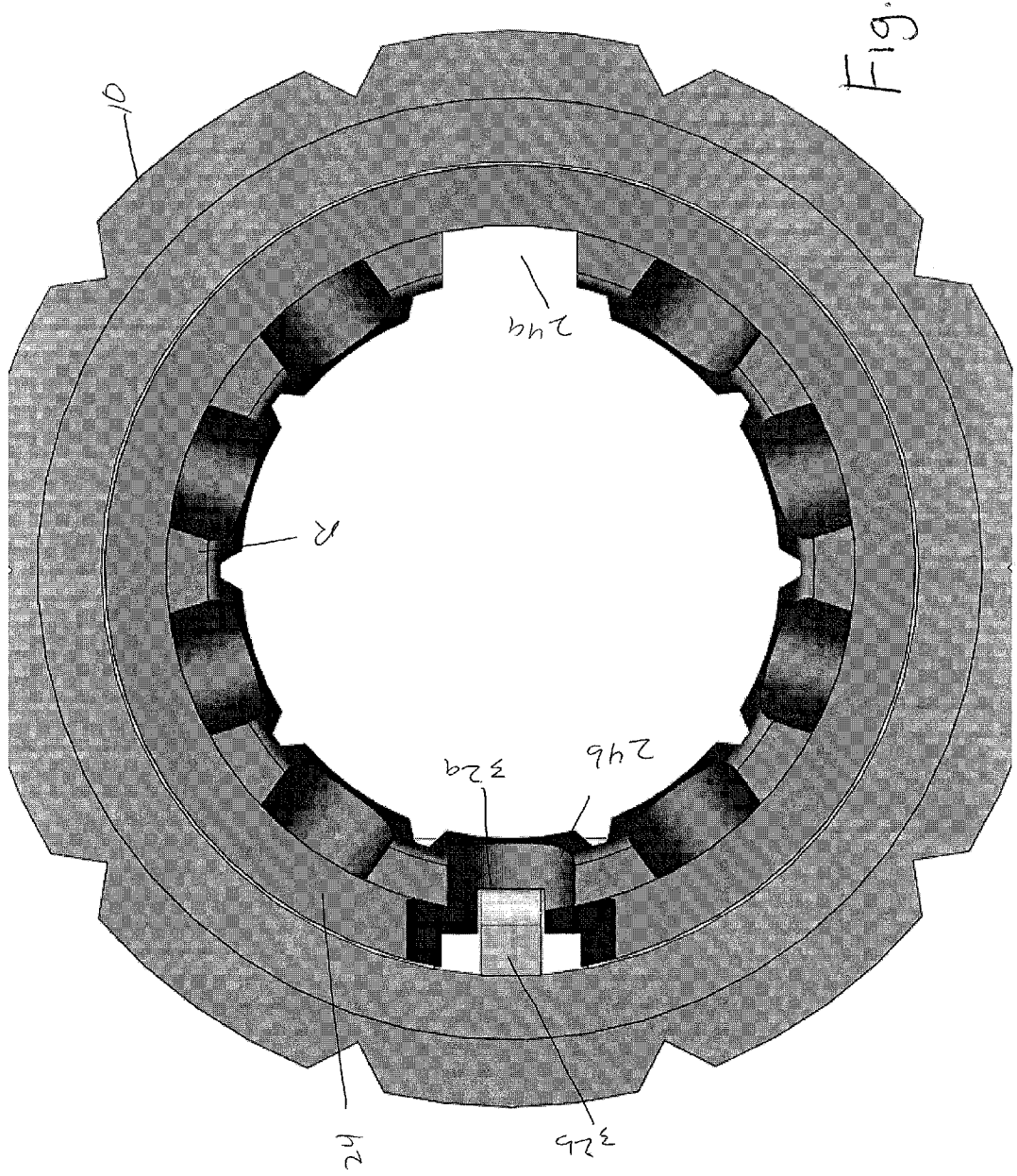
FIG. 12 is a more detailed view of an outer wheel element connected to an inner wheel element using the connector of FIG. 11.

The inner wheel 24 is connected to the outer wheel 10 via the connector 30. The connector 30 is has an oval shape with an opening in the middle through which the rod 20 and cylinder 22 pass. As can be seen in FIGS. 11-12, for example, a resilient member 32 extends outward from the top of the connector 30 perpendicular to the plane of the rest of the connector. This resilient member is triangular in shape with a lower leg 32a that engages the slot 24b in the inner wheel 24 and an upper leg 32b that engages the outer wheel 10. The connector 30 is mounted in the recess 24c of the inner wheel 24 such that it does not occupy space between successive wheels. As a result the wheels 10, 24 are mounted very close together, and even overlap as discussed below. This reduces axial length of the lock 1.

More specifically, the upper leg 32b of the resilient member 32 engages one of several notches 10a formed on an inner surface of the wheel 10. Each notch 10a corresponds to a number or other indicia formed on the outer surface of wheel 10. This allows the user to enter the combination used to unlock the lock 1. Since the inner wheel 24 is connected to the outer wheel 10, rotation of the outer wheel to a desired position will position the slot 24a of the inner wheel 24 in alignment with the protrusions 21 of the rod 20. When all wheels are moved to the respective desired position, all slots 24a of all inner wheels 24 are aligned with the protrusions 21 such that rod 20 is slidable relative to the cylinder 22 to either the open or closed position, as desired by the user.

Figure 13:
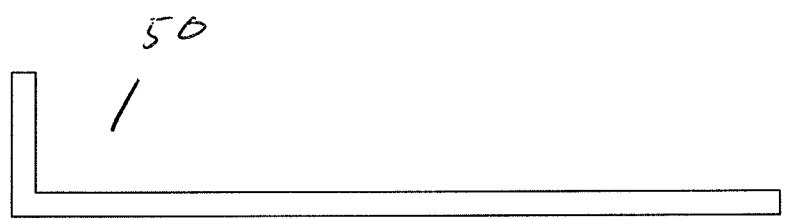
FIG. 13 illustrates an exemplary embodiment of a resetting key for use with a lock in accordance with an embodiment of the present application.

The resilient member 32 may be bent to release the connection of the outer wheel 10 from the inner wheel 24 such that the alignment of the individual slots 10a with the slot 24a can be altered, that is, to change a digit of the combination. As can be seen in FIG. 2A-2C, a resetting slot 11a is provided through the cap 11 and cylinder 22 into the area between the inner and outer wheels 24, 10. A resetting key 50 (See FIG. 13) may be inserted into the resetting slot 11a to depress the upper leg 32b of the resilient member 32 downward such that it does not engage in slot 10a of the outer wheel 10. This resetting operation may only be accomplished when the lock in is the unlocked position. FIG. 2C illustrates the lock 1 in the locked position, and thus, the resetting slot 11a is not aligned with the upper leg 32a of any of the resilient members 32. In the unlocked position, however, the protrusions 21 of the rod 21 will be aligned with the slot 24a in the ridge R of the inner wheel 24. Since the slot 24a is positioned 180 degrees opposite the slot 24b in which the resilient member 32 contacts the inner wheel 24, the resetting slot 11a will be aligned with the resilient members 32 whenever the lock 1 is unlocked.

When the key 50 depresses the upper leg 32b, the outer wheel 10 is disconnected from inner wheel 24 and may be rotated without moving the inner wheel 24. This realignment process may be used to reset the combination for the lock 1. The slot 11a is only accessible from the distal end of the lock such that the resetting process cannot be practiced when the lock 1 is locked to a device such as a laptop. While a key 50 is described herein, it is noted that any narrow and long relatively strong element may be inserted into the resetting slot 11a. For example, a user could simply straighten a paper clip and insert it into the resetting slot 11a to reset the combination. Further, the user may reset all digits of the combination, or may simply change one, two or three digits, as desired.

As is visible in the cross sectional views of FIGS. 2A-2C, the outer wheels 10 are aligned almost immediately adjacent to each other and indeed overlap somewhat. The outer surface of the wheels 10 is offset axially slightly to overhang a recessed portion of the adjacent wheel. In this manner, access to the space between the wheels 10 is restricted without the use of covers, such as used in conventional combination locks. As mentioned above, the caps 9 and 11 hold the elements together in a secure manner, which is more secure than the riveted covers used in conventional locks.

Figure 8:
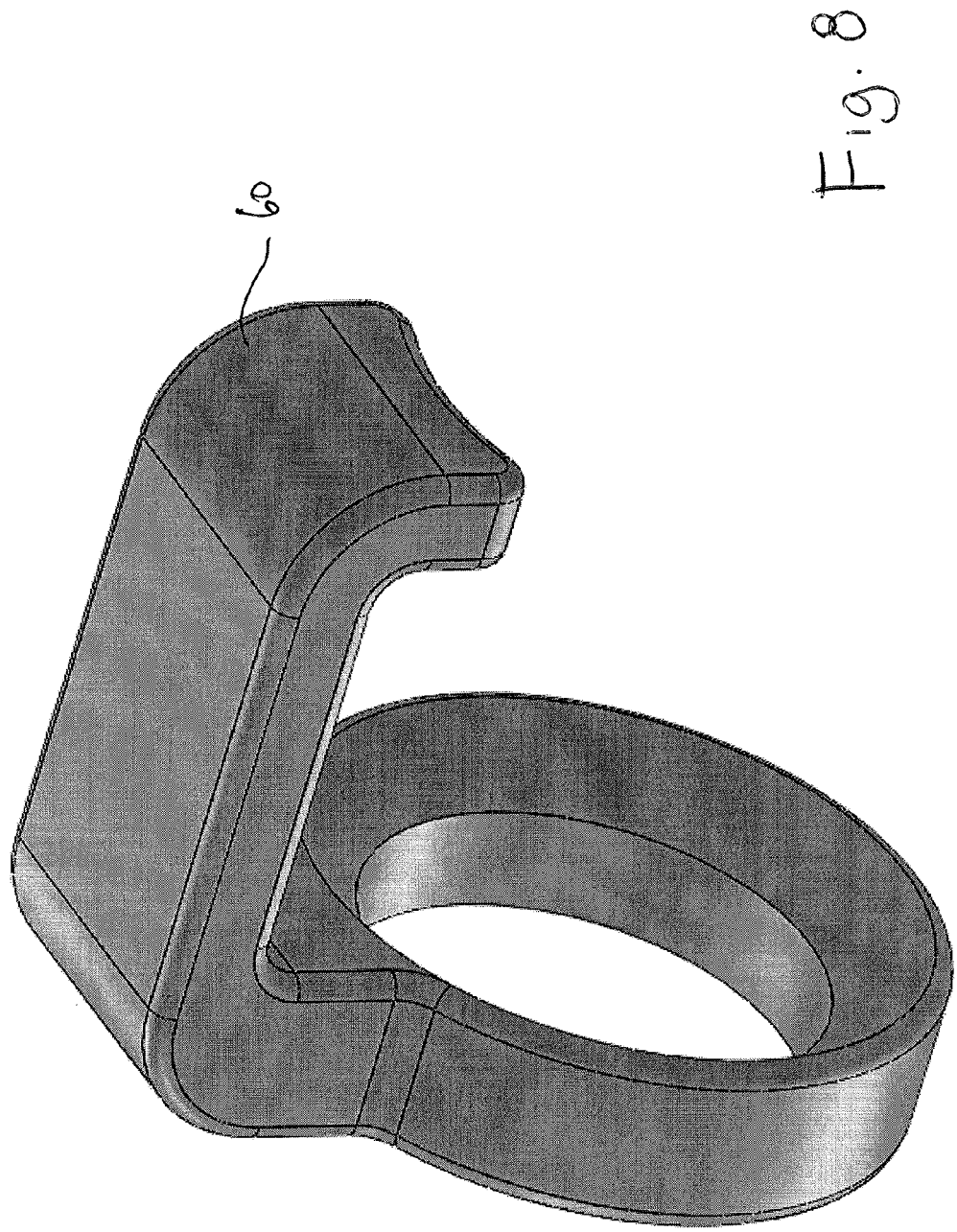
FIG. 8 is an illustration of a cable retainer and cap element.
Figure 10B:
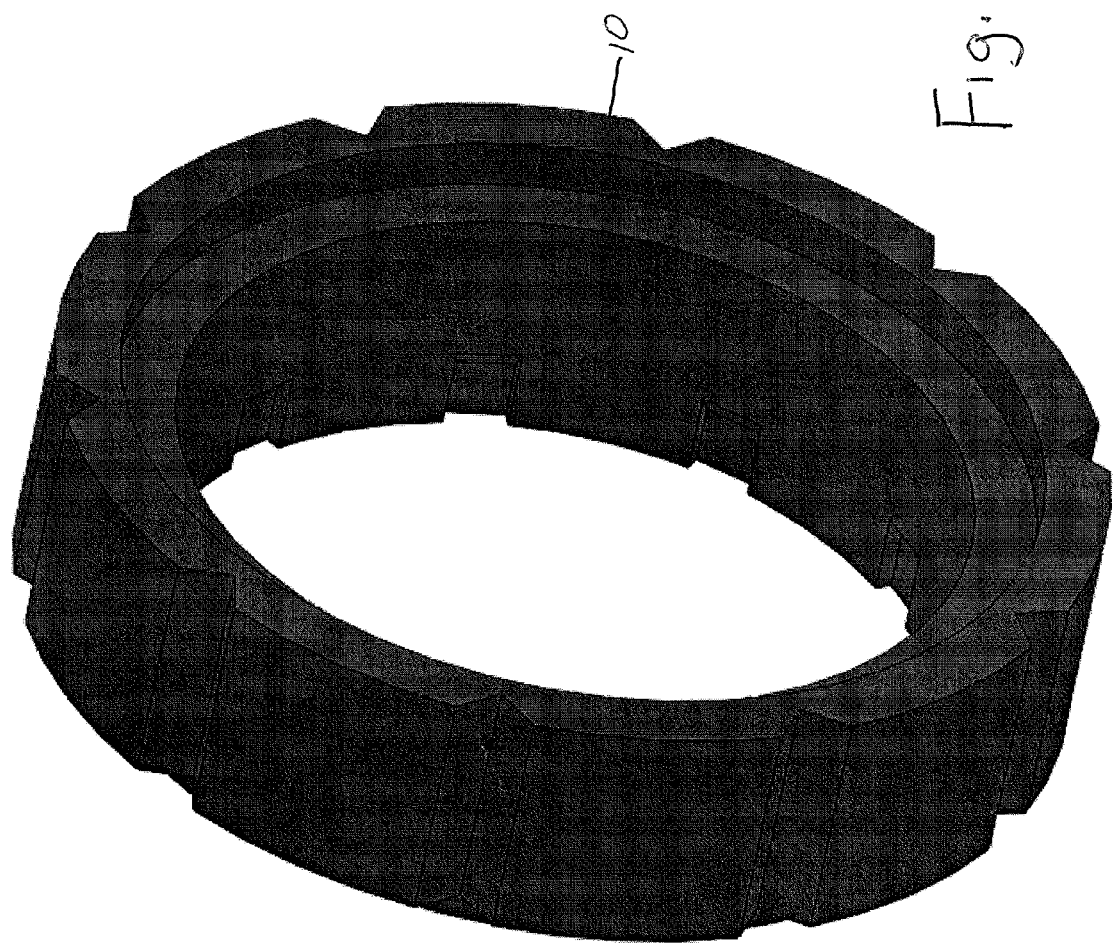
FIG. 10B is a view of the opposite side of the outer wheel element of FIG. 10B.

The cable retainer and cap element 60 shown in FIGS. 1 and 8 can be freely attached and disattached to the locking end of the combination lock and provides space between the lock body and the reentrantly bent piece in which cables and the like can be locked, all as described in U.S. Pat. No. 7,549,308, the contents of which are incorporated fully herein by reference.

Accordingly, the lock 1 of the present application has a minimal axial length and is highly durable and tamper resistant.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lock, comprising:
    a cylinder with a locking tab extending axially from a distal end thereof;
    a rod mounted on the cylinder, and movable between a locked position and an unlocked position to lock and unlock the lock:
    the rod further comprising:
        at least one protrusion on a top surface thereof,
        and a pair of blocking elements extending from a distal end thereof and positioned adjacent to the locking tab when the rod is in a locked position and removed from the locking tab when the rod is in an unlocked position; and
    at least one marked wheel rotatably mounted on the rod and cylinder, wherein positioning of the at least one marked wheel controls movement of the rod;
    the at least one marked wheel further comprising:
    an inner wheel rotatably mounted on the rod and cylinder, and including a ridge extending from an inner surface thereof, the ridge including a slot extending completely through the ridge at a predetermined position on the inner wheel;
    an outer wheel, rotatably mounted on the rod and cylinder outside of the inner wheel and including an outer surface with indicia indicating distinct positions on the outer wheel;
    a connector configured to fit substantially within the inner ring and including a resilient connecting element that engages the outer wheel such that the outer inner wheel rotates with the inner wheel;
    wherein the rod is slidable relative to the cylinder when the slot formed in the ridge on the inner surface of the inner wheel is aligned with the protrusion on the rod; and
    wherein the resilient connecting element is bendable from an engaging position in which the connecting element engages one of the receiving slots of the outer wheel and a resetting position in which the connecting element is not connected to the outer wheel such that the outer wheel is rotatable with respect to the inner wheel.

2. The lock of claim 1, further comprising a second marked wheel positioned adjacent to and overlapping at least a portion of the marked wheel such that an axial length of the lock is minimized.

3. The lock of claim 1, further comprising:
a proximal end cap secured to a proximal end of the rod and cylinder; and a distal end cap secured to a distal end of the rod and cylinder, the proximal end cap and the distal end cap configured to secure the marked wheels, rod and cylinder together.

4. The lock of claim 2, wherein the outer wheel includes a plurality of receiving slots formed in an interior surface of the outer wheel, each receiving slot corresponding to one of the distinct positions indicated on the outer surface of the outer wheel by the indicia.

5. The lock of claim 1, wherein the connecting element is aligned with a selected receiving slot of the outer wheel such that a user rotates the outer wheel to align the slot in the ridge on the inner surface of the inner wheel with the protrusion on the rod, such that the protrusion is slidable through the slot, based on the indicia on the outer surface of the outer wheel.

6. The lock of claim 1, wherein the connecting element is moved into the resetting position to allow the outer wheel to be rotated relative to the inner wheel such that a relationship between the outer wheel and the position of the slot of the inner wheel is modified, the connecting element positioned opposite the receiving slot.

7. The lock of claim 5, wherein the distal cap further comprised a reset slot formed therein and accessible from a distal end of the distal cap, the reset slot configured to accommodate a reset pin that passes through the reset slot to move the connecting element into the resetting position.

8. The lock of claim 6, wherein the connecting element includes a first leg that engages the inner wheel, and a second leg that is movable from the engaging position where the second leg is received in the selected receiving slot of the outer wheel and the resetting position where the second leg does not contact the outer wheel.

9. A marked wheel for use in a combination lock including a rod selectively slidable relative to a cylinder to lock and unlock the lock, the marked wheel comprising:
an inner wheel rotatably mounted on the cylinder and rod, and including a ridge extending from an inner surface thereof, the ridge including a slot extending completely through the ridge at a predetermined position on the inner surface of the wheel;
an outer wheel, rotatably mounted on the rod and cylinder outside of the inner wheel and including an outer surface with indicia indicating distinct positions on the outer wheel;
a connector configured to fit substantially within the inner wheel and including a resilient connecting element that selectively engages the outer wheel such that the outer wheel, inner wheel and connector rotate together, and
wherein the connecting element is bent into the resetting position to allow the outer wheel to be rotated relative to the inner wheel such that a relationship between the outer wheel and the position of the slot formed in the ridge on the inner surface of the inner wheel is modified, the connecting element positioned opposite the receiving slot.

10. The marked wheel of claim 9, wherein the outer wheel includes a plurality of receiving slots formed in an inner surface of the outer wheel, each receiving slot corresponding to one of the distinct positions indicated by the indicia on the outer surface of the outer wheel.

11. The marked wheel of claim 10, wherein the resilient connecting element is bendable from an engaging position in which the connecting element engages one of the receiving slots of the outer wheel and a resetting position in which the connecting element is not connected to the outer wheel such that the outer wheel is rotatable with respect to the inner wheel.

12. The marked wheel of claim 11, wherein the connecting element is aligned with a selected receiving slot of the outer wheel such that a user rotates the outer wheel to align the slot in the ridge on the inner surface of the inner wheel with a protrusion on the rod, such that the protrusion is slidable through the slot based on the indicia on the outer surface of the outer wheel.

13. The marker wheel of claim 9, wherein the connecting element includes a first leg that engages the inner wheel, and a second leg that is movable from the engaging position where the second leg is received in the selected receiving slot of the outer wheel and the resetting position where the second leg does not contact the outer wheel at all.

* * * * *